Figure 1:
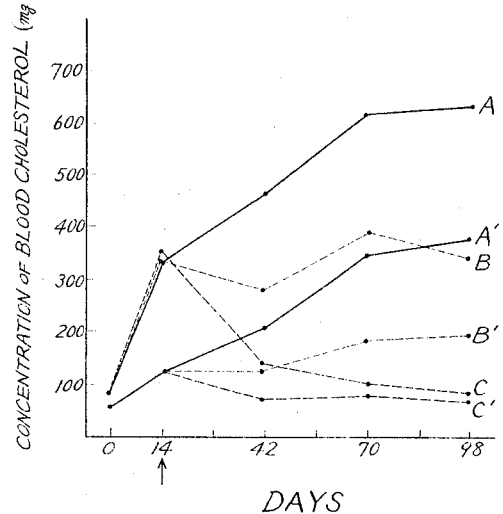

BLEEDING TIME AFTER ADMINISTRATION (HOUR)

DOSE (mg/kg)

United States Patent Office 3,271,250
Patented Sept. 6, 1966

3,271,250
THERAPY AND CONTROL OF ATHEROSCLEROTIC DISEASES
Ken-Ichi Kanazawa, Kamikotoen, Nishinomiya, and Taizo Matsukawa and Yoshitomo Aramaki, Suita, all of Japan, assignors to Takeda Chemical Industries, Ltd., Osaka, Japan
Filed Nov. 15, 1961, Ser. No. 152,515
Claims priority, application Japan, Nov. 17, 1960, 35/45,838
9 Claims. (Cl. 167—65)

This invention relates to improvements in therapy and provention of atherosclerotic diseases, more concretely, to the new medicinal use of cholestane-3,5,6-triols and their related compounds alone or in combination with inert carriers for the purpose of prevention and treatment of atherosclerotic diseases and for the enhancement of native resistance of the body. These compounds may also be utilized as a food additive for the same purpose.

The control of atherosclerotic diseases is one of the most important problems in the medical field at present, and great effort to solve this problem has been made widely.

However, hitherto proposed drugs for said diseases do not always have expected effect, but are accompanied by substantial undesired side effects. For example, thyroxin derivatives have such side effects as increases of basal metabolic rate and heart rate which are contraindicant to said diseases, which are usually accompanied by heart failures. Niacine has such undesirable side effects as flash of face, headache and nausea. Compounds which have been insisted to have inhibitory action upon biosynthesis of cholesterol are found to show such an undesirous side effect as disturbance of physiologically important steroid metabolism. Other compounds which are insisted as effective to said diseases, β-sitosterol, unsaturated fatty acids and miscellaneous compounds are quite slightly effective even by the administration of a massive dosage on the critical experimental level and/or properly designed clinical observations.

The principal object of the invention is therefore to provide a means for treating patients suffering from so-called atherosclerotic diseases and for preventing man who has been diagnosed as being endangered to suffer from atherosclerotic diseases without substantial side-effect as mentioned above.

It is also the object of this invention to provide pharmaceutical compositions which, on administration to a patient suffering from atherosclerotic diseases or to man having been endangered to suffer from said diseases, cause recovery in full aspects on the symptoms and for man from suffering from said diseases, without substantial undesired side-effects, especially on the basal metabolic rate and/or on the heart rate.

It is a further object to provide a means for enhancing native resistance of human bodies against infection and even counteracting the reduction in the resistance caused by the administration of ordinary glucocorticoids.

Pharmaceutically active ingredients usable for realizing said objects in this invention are those compounds having the following general formula,

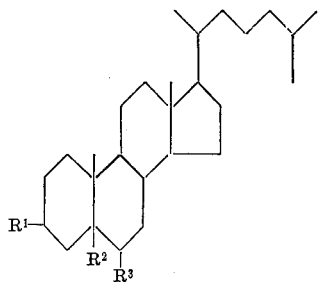

(I)

wherein $R^1$ and $R^3$, both of which may take α- or β-configuration, stand for respectively =O, —OH, —OCOR, —OCOOR, —OCO(CH$_2$)$_n$X, —OCO(CH$_2$)$_n$NR$_2$, —OCO(CH$_2$)$_n$, NR$_2$·HB, —CO(CH$_2$)$_n$COOM, —OSO$_3$M or —OPO$_3$M$_2$, where R represents hydrogen or a lower alkyl, R' represents a lower alkyl, X represents a halogen, M represents hydrogen, an alkali metal or univalence of an alkaline earth metal, HB represents a substantially non-toxic mineral acid forming an addition salt and $n$ is an integral number from 1 to 5; $R^2$ stands for hydrogen or a lower fatty acid acyl.

Those compounds of the general Formula I, which are used as main active agents for the present invention, are all presently-preparable favorably for example by such a synthetic process or processes as (A), (B), and/or (C) mentioned below.

(A) Cholestane-3,5,6-triols and their esters are prepared from cholesterol or its esters by oxidizing the starting steroids with an agent such as performic acid, peracetic acid, perbenzoic acid, periodic acid, permanganic acid, osmium tetroxide, their salts, or the like, and when the oxidation product is obtained in the form of 5,6-epoxide, the 5,6-epoxide is further hydrolyzed with the action of an acid to give 5,6-glycol.

(B) Various esters, i.e. mono- and di-, and in some case tri-, esters, of cholestane-3,5,6-triols are prepared from cholestane-3,5,6-triols or their partial esters by allowing the starting steroids to react with such an acid as capable of forming the acid moiety of the desired esters to be prepared or with a reactive derivative of the acid, for example, acid anhydride or acid halides. As the acid to be incorporated to the desired ester, organic acids such as fatty acids, containing formic acid, halofatty acid, aminofatty acid, mono- or dialkylaminofatty acids, acylaminofatty acids, aromatic carboxylic acids, sulfonic acids, carbonic acid monoesters, phosphoric acid and its partial esters, sulfuric acid and its partial esters, and so on. The reaction may favorably be carried out in the presence of an inorganic or organic base such as alkali metal hydroxide, alkali metal carbonate, pyridine, dimethylformamide, or the like.

(C) The aminofatty acid esters and the substituted aminofatty acid esters of cholestane-3,5,6-triols are also prepared from the corresponding halofatty acid esters of cholestane-3,5,6-triols, by allowing the starting steroids to react with ammonia or a desired amine.

Typical processes for producing the novel compounds of the general Formula I are set forth only by way of exemplary illustration and not at all by the way of limitation of the compounds usable for the present invention. In these descriptions, the temperatures are all uncorrected, and all analytical values are in percent by weight, and the relation of parts by weight to parts by volume is the same as grams to cubic centimeters.

(1) Cholestane-3β,5α,6β-triol 3β-hemisuccinate and salt thereof.

To a solution of 2 parts by weight of cholestane-3β,5α,6β-triol—which melts at 233–235° C.—in 20 parts by volume of pyridine was added 3 parts by weight of succinic anhydride and the mixture was heated on water bath for an hour. The reaction mixture was poured into 300 parts by volume of ice water, and the aqueous mixture was acidified with hydrochloric acid to separate out white crystals, which were collected by filtration, washed with water, and then recrystallized from ethyl acetate to give 2 parts by weight of cholestane-3β,5α,6β-triol 3β-hemisuccinate having the following properties:

Melting point: 223–224° C.
Specific rotation: $[\alpha]_D^{21} = -12°$ (in chloroform)
Analysis.—Calcd. for $C_{31}H_{52}O_6$: C, 71.50; H, 10.07.
Found: C, 71.38; H, 9.87.

The hemisuccinate thus obtained was agitated in an aqueous solution containing the equivalent moles of sodium hydrogen carbonate, whereupon the semisuccinate was dissolved and turned into the corresponding sodium salt.

(2) Cholestane-3β,5α,6β-triol 3β-diethylaminoacetate.

To a solution of 2 parts by weight of cholestane-3β,5α,6β-triol in 20 parts by volume of dimethylformamide was gradually added 0.8 part by weight of diethylaminoacetic acid chloride under agitation and ice-cooling. After 2 hours, water and sodium hydrogen carbonate were gradually added to the reaction mixture to separate crystals, which were collected by filtration, washed with water, and recrystallized from diluted acetone to give leaflet crystals of cholestane-3β,5α,6β-triol 3β-diethylaminoacetate having the following properties:

Melting point: 140–141° C.
Specific rotation: $[\alpha]_D^{22} = -6°$ (in ethanol)
Analysis.—Calcd. for $C_{33}H_{59}O_4N$: C, 74.15; H, 11.02. Found: C, 74.26; H, 11.29.

The ester thus obtained was agitated with 10% hydrochloric acid, whereupon the crystals of the ester were dissolved and the corresponding hydrochloride was obtained.

(3) Cholestane-3β,5α,6β-triol 3β-chloroacetate.

(a) To a solution of 3 parts by weight of cholestane-3β,5α,6β-triol in 100 parts by volume of dimethylformamide was added 1.2 parts by weight of chloroacetic acid chloride. The mixture was thoroughly shaken and then allowed to stand for an hour at room temperature. Water was gradually added to the reaction mixture to separate crystals, when the mixture per se became viscous. The viscous mixture was extracted with ether, and the ethereal solution was washed with water, and dehydrated. To the dried solution was added methanol and the mixture was concentrated to give 2 parts by weight of leaflet crystals of cholestane-3β,5α,6β-triol 3β-chloroacetate having the following properties:

Melting point: 229–231° C.
Analysis.—Calcd. for $C_{29}H_{49}O_4Cl$: C, 70.06; H, 9.94. Found: C, 69.80; H, 10.26.

(b) To a solution of 5 parts by weight of cholesterol chloroacetate in 100 parts by volume of 90% formic acid was added 10 parts by volume of 30% hydrogen peroxide, and the mixture was kept at a temperature of 50 to 60° C. for an hour. To the reaction mixture was then added water and the aqueous mixture was extracted with ether. The ethereal solution was washed with water and concentrated under reduced pressure to obtain a condensate, which was dissolved in 50 parts by volume of methanol. To the solution was added 10 parts by volume of 10% acidic methanol solution of hydrogen chloride. The mixture was allowed to stand for 5 hours, and, after addition of water, extracted with a mixture of methylene chloride and ether. Methanol was added to the organic solvent layer and the mixture was concentrated to separate 2.5 parts by weight of leaflet crystals which melts at 231° C. No depression of the melting point was observed at the mixed examination of so-obtained crystals with cholestane-3β-5α,6β-triol 3β-chloroacetate.

(4) Cholestane-3β,5α,6β-triol 3β,6β-bis-chloroacetate.

To a solution of 3 parts by weight of cholestane-3β,5α,6β-triol in 30 parts by volume of dimethylformamide was added 3 parts by weight of chloroacetic acid chloride at room temperature, whereupon spontaneous reaction took place exothermically. The reaction mixture was kept at 60–70° C. for 30 minutes and thereto was added water gradually to separate out oily substance, which turned after a while to white crystals, which were collected by filtration, washed with water, and dried. The crystals were dissolved a little amount of methylenechloride and methanol was added to the solution. The mixture was then concentrated to give 2.6 parts by weight of cholestane-3β,5α,6β-triol 3β,6β-bis-chloroacetate having the following properties:

Melting point: 166–167° C.

Analysis.—Calcd. for $C_{31}H_{50}O_5Cl$: C, 64.8; H, 8.72. Found: C, 64.30; H, 8.75.

(5) Cholestane-3β,5α,6β-triol 3β-iodoacetate.

To a solution of 2 parts by weight of cholestane-3β,5α,6β-triol 3β-chloroacetate—preparable for example through the process mentioned in the preceding item (3)—in 100 parts by volume of acetone was added 5 parts by weight of sodium iodide, and the mixture was boiled for 10 minutes on a water bath and then allowed to cool. Water was gradually added to the reaction mixture to separate crystals, which were collected by filtration, washed with methanol, and dried to give 2.1 parts by weight of cholestane-3β,5α,6β-triol 3β-iodoacetate melting at 196–197° C. The product was dissolved in a mixture of methanol and methylene chloride and the solution was concentrated to give leaflet crystals melting at 196–197° C.

Analysis.—Calcd. for $C_{29}H_{49}O_4I$: C, 59.17; H, 8.37. Found: C, 59.07; H, 8.15.

(6) Cholestane-3β,5α,6β-triol 3β,6β-bis-iodoacetate.

To a solution of 2.5 parts by weight of cholestane-3β,5α,6β-triol 3β,6β-bis-chloroacetate—preparable for example through the process mentioned in the preceding item (4)—in 60 parts by volume of acetone was added 5 parts by weight of sodium iodide, and the mixture was heated for 10 hours and then allowed to cool. Water was gradually added to the reaction mixture to separate out oily substance, which turned after a while to crystals, which was collected by filtration, washed with water, dried, and dissolved in a little amount of acetone. To the acetone solution was added methanol, and the mixture was concentrated. The condensate was allowed to stand for a while to separate square plate crystals, which were collected by filtration to obtain 2.9 parts by weight of cholestane-3β,5α,6β-triol 3β,6β-bis-iodoacetate having the following properties:

Melting Point: 129–130° C.
Analysis.—Calcd. for $C_{31}H_{50}O_5I_2$: C, 49.3; H, 6.62. Found: C, 49.60; H, 6.78.

(7) Cholestane-3β,5α,6β-triol 3β-hemisuccinate 6β-acetate.

To a solution of 5 parts by weight of cholestane-3β,5α,6β-triol 3β-hemisuccinate—preparable for example through the process mentioned in the preceding item (1)—in 20 parts by volume of pyridine was added 5 parts by volume of acetic anhydride, and the mixture was allowed to stand overnight. The solvent was distilled off under reduced pressure. The residue was dissolved in water and the aqueous solution was acidified with hydrochloric acid to separate out precipitates, which were collected by filtration, washed with water, dried, and recrystallized from methanol to give crystals of cholestane-3β,5α,6β-triol 3β-hemisuccinate 6β-acetate having the following properties:

Melting Point: 117–119° C.
Analysis.—Calcd. for $C_{33}H_{54}O_7$: C, 70.43; H, 9.67. Found: C, 70.70; H, 9.38.

(8) Cholestane-3β,5α,6β-triol 3β-phosphate and its salts.

A solution of 5 parts by weight of cholestane-3β,5α,6β-triol in 25 parts by volume of pyridine was added dropwise into a solution of 8.7 parts by weight of phosphorous oxychloride in 25 parts by volume of anhydrous acetone under agitation and ice-cooling. The reaction mixture was poured into an excess of ice water to separate white crystals, which were collected by filtration, washed and dried under reduced pressure to give cholestane-3β,5α,6β-triol 3β-phosphodichloride having the following properties:

Melting Point: 123–124° C.
Analysis.—Calcd for $C_{27}H_{47}O_4PCl_2$: P, 5.77. Found: P, 5.74.

The phosphodichloride thus obtained was suspended in water in a quantity of 30 times as much as the phosphodichloride. The suspension was boiled for an hour to give a paste-like solution, in which the phosphodichloride was changed into the corresponding phosphate. The paste was neutralized with a 3% aqueous potassium hydroxide solution, whereupon the solution became clear and the phosphate was changed into the corresponding potassium salt. To the solution was added a 10%-aqueous calcium chloride solution to separate crystals, which were collected by filtration, washed with water, and dried to give calcium cholestane-3β,5α,6β-triol 3β-phosphate having the following properties:

Melting Point: 224–235° C.

Analysis.—Calcd. for $C_{27}H_{47}O_6P \cdot \frac{1}{2}Ca \times 2$: P, 7.44. Found: P, 7.82.

(9) Cholestane-3β,5α,6β-triol 3β-sulfate and its salts.

(a) To 20 parts by volume of pyridine cooled at $-10°$ C. was gradually added 1.2 parts by weight of chlorosulfonic acid under vigorous agitation, and the mixture was added at $-10°$ C. to a solution of 4.2 parts by weight of cholestane-3β,5α,6β-triol in 40 parts by volume of pyridine, the solution also having been allowed to cool at said temperature. The whole mixture was allowed to stand for 2 hours at room temperature to cause reaction to take place. After the addition of 50 parts by volume of water, the reaction mixture was extracted twice with ethyl acetate to remove unreacted starting steroid. The aqueous layer was allowed to pass through a column packed with basic ion-exchange resins, whereby the product was adsorbed on the resins, which were then eluted with water to separate out impurities such as inorganic salts or pyridine and with 2% aqueous ammonia solution to obtain a solution of the object compound, from which 4.5 parts by weight of sodium cholestane-3β,5α,6β-triol 3β-sulfate was obtained by evaporation of solvent.

(b) A mixture of 4.2 parts by weight of cholestane-3β,5α,6β-triol, 20 parts by volume of dimethylformamide and 1 part by weight of sulfamic acid was heated for 20 minutes on water bath with vigorous agitation. To the mixture was added 50 parts by volume of water, which was followed by 0.85 part by weight of sodium hydrogen carbonate, and the whole mixture was well shaken and was extracted twice with ethyl acetate to remove unreacted starting steroid. The aqueous layer was concentrated under reduced pressure to dryness and the residue was washed with ether and then dried to give 4.5 parts by weight of sodium cholestane 3β,5α,6β-triol 3β-sulfate.

(10) Cholestane-3β,5α,6β-triol 3β-hemisuccinate 6β-formate and its salts.

To a solution of 10 parts by weight of cholesterol in 50 parts by volume of pyridine was added 5 parts by weight of succinic anhydride, and the mixture was warmed on water bath for 5 hours and then was allowed to stand overnight at room temperature. The solvent was evaporated under reduced pressure to give dry residue, to which methanol was added. The solution was heated and the solvent was again evaporated to dryness. The residue was dissolved in a mixture of methylene chloride and methanol and the solution was concentrated, whereupon separate crystals, which were collected by filtration and washed with methanol to give needle crystals of cholestane 3-hemisuccinate, melting at 177–179° C.

A mixture of 3 parts by weight of thus obtained cholesterol 3-hemisuccinate, 50 parts by volume of 85% formic acid and 3 parts by volume of 30% hydrogen peroxide was allowed to stand overnight at room temperature. Water was added to the reaction mixture to separate crystals, which were collected by filtration and washed with water to give cholestane-3β,5α,6β-triol 3-hemisuccinate 6-formate melting at 124° C.

The product was shaken with an aqueous solution dissolving the equivalent amount of sodium hydroxide carbonate, whereupon the crystals of steriod were dissolved and the hemisuccinate was transformed into the corresponding sodium salt.

In a similar manner to or by further devising the above-exemplified processes, there can be be obtained homologs of the respective compounds aforementioned which are listed below:

Cholestane-3β,5α,6α-triol;
Cholestane-3α,5α,6β-triol;
Cholestane-3α,5α,6α-triol;
5α,6β-dihydroxycholestan-3-one;
3β,5α-dihydroxycholestan-6-one;
3β,6β-diacetoxycholestan-5α-ol;
5α,6β-diacetoxycholestan-3β-ol;
3β,5α,6β-triacetoxycholestane;
3β-acetoxycholestane-5α,6β-diol;
5α,acetoxycholestane-3β,6β-diol;
6β-acetoxycholestane-3β,5α-diol, etc.

Those compounds in which the acetoxy group or acetoxy groups are replaced with afore-said respective acyloxy group or groups can also be prepared in a similar manner to that for producing the acetates.

The compounds of the general Formula I are fairly stable and non-toxic, and therefore can be applied to living bodies including human bodies in oral or injective administration as well as topical application without any substantially undesirable side-effect to the living bodies. When administered into human bodies, the compounds may be taken in the form of a variety of pharmaceutical preparations, for example, solid preparations such as powders, tablets, pills, etc. or liquid preparations such as solutions, emulsions, injections, etc. They also may be added into foodstuffs so that they may be taken up by patients together with the foodstuffs at each diet, when their continuous administration is required.

The compounds I are generally administered rather much in their quantity into living bodies, though there are more or less differences between respective compounds in the most desirable quantities to be administered, and in accordance with the condition of the patients a fairly large amount of their daily administration may be desired. Therefore, there is the case that it is rather convenient to apply the compound per se or a mixture of those compounds as powders. However, those compounds are usually desirable to be administerd in the form of pharmaceutical preparations to be mentioned below, which are prepared so as to make them convenient for long storage as well as for easy administration.

When they are used as powdery form, one or more kinds of excipient such as lactose, sucrose, glucose, starch, sodium chloride, talc, aluminium silicate, potassium sulfate, calcium carbonate, sodium hydrogen carbonate, etc. are appropriately selected in accordance with the form of active ingredients, the selected excipients are adequately powdered and mixed with the active ingredients uniformly. Only thus treated, the preparations can be easily administered to patients and are quickly dispersible in gastric juice when administered orally. The preparations are also suitable for storage.

When one or more of the compounds are used as the active ingredients in tablets, the ingredient per se may be punched in suitable dies, or such excipients as mentioned above in the explanation on powdery form may be utilized also in this case. For the purpose of preventing tablets from possible breakage at punching or during storage, there is usually added as an adhesive substance or substances which are pharmacologically inert, viscous and soluble in water, for example, starch paste, dextrin, mucilage of acacia or tragacanth, gelatin, syrup, concentrated glucose solution, methylcellulose, etc. In addition to those excipients and adhesives, there may also be added carboxymethylcellullose, pectin, calcium phosphate, calcium citrate, etc. The addition of a small proportion of a lubricant to granules of the composition may be required to prevent them from sticking to the punches and dies during compression. For this purpose, fine powders of talc, boric acid, stearic acid, stearic acid salt, or the like are usually employed as the lubricant in a quantitiy of about 1 to 2 percent by weight relative to granules. Each tablet is made up so as to weigh 0.1 to 1.0 gram. If desired, sugar coating, enteric coating or the means of gelatin capsules may be applied to this preparation in order to make the tablets suitable for storage and administration. For example, enteric coating of tablets may be made in accordance with the following prescription:

| Composition of bare tablets: | Mg./tablet |
|---|---|
| Cholestane-3β,5α,6β-triol 3,6-diformate | 200 |
| Wheat starch | 94 |
| Gelatine | 4 |
| Magnesium stearate | 2 |
| Total | 300 |

| Composition of enteric solution: | |
|---|---|
| Isopropanol | 88 |
| Benzene | 88 |
| Dibutyl phthalate | 8 |
| Cellulose acetate phthalate | 16 |
| Total | 200 |

The mixture of isopropanol and benzene is added to cellulose acetate phthalate and the later is dissolved in the former under agitation. To the solution is added dibutyl phthalate to afford the desired enteric solution.

Liquid preparations for internal use are composed on the basis of solution or suspension of the active ingredients in a suitable medium such as water or an aqueous mixture with ethanol, glycerine, etc. These basic preparations may be appropriately flavored, and if desired, may be based upon more improved prescriptions. Among the compounds I, derivatives such as partial esters between the free sterols and polybasic acids or dialkylamino fatty acid esters are easily soluble in water in the form of salts, and therefore these compounds soluble in water are conveniently used for aqueous solutions. However, the other compounds are generally not easily soluble in water, so that they are suspended as fine particles in water. But, as these compounds are not easily soluble in water but in alcohol, they may be dissolved in 5–40% aqueous ethanol solution and, if desired, their taste and/or odor may further be ameliorated by the addition of simple syrup, spices, or the like.

These compounds, which are hardly soluble in water, are desirably dispersed in a liquid medium as emulsions colloid solutions with the aid of a non-toxic emulsifier, or a surface active substance. Those compounds are uniformly dispersible in the liquid phase in either type of water-in-oil or oil-in-water by the use of an emulsifier or emulsifiers non-toxic to human bodies. For example, sorbit ester derivatives—e.g. sorbitane fatty acid esters, polyoxyethylenesorbitane fatty acid esters, etc.—sugar esters—e.g. fatty acid esters of sucrose, maltose or rhamnose—methylcellulose, carboxymethylcellulose, and so on are examples of synthesized emulsifiers suitable for the said purpose, and they are usually employed in a quantity of about 2 to 5 times as much as the active ingredients. In addition to the above-enumerated artificial ones, other emulsifying substances of natural sources such as mucilages of acacia or of tragacanth, gelanic, agar, yolk, albumin, pectin, or the like can also be employed when it is unnecessary to store the emulsion to be prepared for a rather long period. Anyhow, as these emulsifying substances of natural sources are apt to rot, it is desired that they are employed along with application of anti-septic treatment, e.g. addition of a small quantity of parabenzoic acid esters.

The compounds I may be used as injections. It is especially convenient for injections to use those derivatives which are soluble in water and which are represented by polybasic acid esters and substituted aminofatty acid esters of the sterols. As injections should be around isotonic to the body fluid of patients and about neutral in pH, it is desired that the active ingredient or ingredients are dissolved in physiological salt solution or Ringer's solution depending on the concentration of the active ingredients, or that an aqueous solution of the active ingredient or ingredients are supplied with calculated quantities of one or more sodium chloride, glucose, the other inert ingredients and/or medicaments having activities other than that of the instant active ingredients. Thus prepared solutions for injections are sterilely filtered and sterilely enclosed in containers such as glass ampules or glass vials with rubber caps to be kept until they are actually used. In accordance with the kinds of the active ingredients and/or with prescriptions, it may be desirable that the part other than water in the prescription for injections is enclosed in one container and the water part in another container, and that both in the respective containers are mixed when actually applied.

Even when it is required that the active ingredients being hardly soluble in water are used as injections, the application becomes possible by suspending the active ingredients ground into minute particles in sterilized water or by dispersing as emulsion or colloid solution with the aid of emulsifiers non-toxic to body fluid. The emulsification or dispersion into colloid solution can be carried out in the same manner as afore-mentioned in the explanation on internal liquid preparations. However, careful attention is required in this case taking into consideration that injection is to be directly mixed with the body fluid of patients, that it must be bearable against sterilization treatment and that it is desired to stand longer sorage than the case of internal liquid preparations. For example, proteins or some other high-molecular substances must not be used as emulsifiers because they might act as antigens to the living bodies if introduced into body fluid.

In place of water, purified vegetable oil such as sesame oil, peanut oil, apricot kernel oil or mono- or diglycerides of fatty acids may be used as the media dissolving or suspending the active ingredients. However, it should of course be avoided to use these lipoidal media in such a case that the injections are to be applied for the purpose of making patients recover from the symptom of lipoemia, where it is undesirable to be further injected surplus lipoidal substances into body fluid.

Depending on the purpose of the administration, it is desired that the active ingredients in this invention are administered in a fairly large dose every day. There may be persons who do not like to use such preparations as mentioned hereinbefore. In these cases, it is possible to add the active ingredients into foodstuffs or beverages to be taken up by patients lest the patients should feel uncomfortable. For example, the active ingredients may be kneaded into butter, chocolate, or chewing gum, or may be made into troches or syrup, or may be dissolved in alcoholic liquors such as wine, whiskey, brandy, or a variety of liqueurs.

In accordance with the actions and the purposes of application, the compounds I are generally administered per os, or injected, or inserted into the living bodies. However, as one of means for applications to strengthen the effectivities or to prevent the undesirable side-effects of such medicaments as antibiotics, isonicotinic acid hydrazide or its derivatives, sulfamines, glucocorticoids, and so on, the compounds I may be topically used as for example plasters or creams, in which the compounds I take a role of the second basis to supplement the effectivities of the first basis as enumerated above.

Orally administerable dose to human body is represented by about 5 grams/50 kilograms/day in the case of cholestane-3β,5α,6β-triol. The minimum dose to show their own effects does not so vary with the differences in chemical structures among the respective compounds, and comes to be about 0.1 gram/50 kilograms/day in each compound. On the other hand, the compounds I show very low toxicities to living bodies and it is noteworthy that cholestane-3β,5α,6β-triol 3,6-diformate is especially non-toxic and is concluded to be administerable in even such a high dose as 12.5 grams/50 kilograms/day. Therefore, it is desired to be taken into consideration at their respective applications that a patient is administered with about 0.1 to 10 grams, and usually 1 to 2 grams, of the compounds I in a day.

The medicinal effects observed in a fairly wide scope of compounds as shown as the general Formula I suggest that the activity in animal body will be due to some metabolites derived in vivo from the compounds I.

To clarify the new and novel usefulness of these compounds, evidence will be shown by some of the animal experiments. For example, the efficacy in preventing the accumulation of cholesterol in rabbit fed high cholesterol diet is so prominent that will warrant the medicinal application of these compounds.

As the clinical evaluation of any anti-atherogenic drug is very difficult to assess when the lowering effect on blood cholesterol levels, if any, is not very marked in man as encountered with these compounds, the beneficial effect of clinical application of cholestane-3β,5α,6β-triol 3,6-diformate to cases of intermittent claudication will also be presented herewith.

Moreover, animal experiments revealed that these compounds exert also many interesting and favorable influence upon animal body. Among them, the clearing of alimentary lipemia was demonstrated in rats. The lipemia clearing action is generally conceived to be favorable in controlling atherogenesis. Evidence was also given to show that these compounds cause the enhancement of native resistance to infection and even counteract the reduction in resistance to infection caused by the administration of cortisone acetate. These compounds will be therefore also useful in potentiating the chemotherapeutic drugs.

Among those related compounds, cholestane-3β,5α,6β-triol 3,6-diformate was shown to be least toxic; 2 gr. per day have, in effect, been administrated to a patient for more than nine months without any side effect.

In the following descriptions, cholestane-3β,5α,6β-triol and its 3,6-diformate are abbreviated as "CT" and "CT-DF," respectively.

EXPERIMENT 1

The effect of CT on the experimental atherosclerosis of cholesterol fed rabbits. Eighteen male rabbits (body weight 2.6±0.2 kg.) consisting of 6 liters were fed to commercial rabbit chow supplemented with 0.5% cholesterol which had been dissolved in cottonseed oil corresponding to 6% of rabbit chow for three months. Two weeks after the start of cholesterol feeding, the levels of cholesterol in blood were determined, then all rabbits were distributed into three groups A, B and C so that each group has at least one animal from each liter and the average of blood cholesterol levels in each group is almost identical. After this time on, each group is fed diet A, B and C.

Diet A: cholesterol diet as above.
Diet B: cholesterol diet supplemented with 0.2% of CT.
Diet C: cholesterol diet supplemented with 0.5% of CT.

Blood cholesterol was determined by Lieberman-Burchard method on the 28th, 56th and 74th day after CT-treatment. All rabbits are sacrificed at the 98th day after the start of cholesterol feeding.

Shifts of blood cholesterol levels and other lipid values are shown in Table I and FIGURE 1. In FIGURE 1, the curves A, B and C represent total cholesterol level in blood and A', B' and C' show the free cholesterol level of each group respectively. Degree of atheroma of each group is shown in Table II. And atherosclerotic changes of arteria pulmonalis and arteria coronaris are almost parallel to the degree of aortic changes.

Table I

| Group (6 rabbits) | A | B | C |
|---|---|---|---|
| Degree* of atheroma of each rabbit in aorta | 4, 4, 3 4, 3, 4 | 3, 1, 0 3, 1, 2 | 2, 0, 0 1, 0, 1 |
| Average | 3.7 | 1.7 | 0.7 |

*0—no atheroma.
1—slight atheroma focci.
2—atheroma covering less than of ⅙ of aorta.
3—atheroma covering ⅙-⅓ of aorta.
4—atheroma covering more than ⅓ of aorta and the lesion is thick and severe.

Thus, CT shows a remarkable effect which has not yet been experienced by using other anti-atherogenic drugs. That is, 0.5% CT-supplement (C group) decreased the blood cholesterol in only 4 weeks to the normal level in spite of the continued cholesterol feeding. The half of rabbits in group C did not show any atherosclerotic changes of aorta after 3 months of cholesterol feeding in contrast to the control group A which showed severe atherosclerosis. Also the changes in liver and adrenal gland induced by cholesterol feeding were surprisingly reduced by the CT-supplement. The enlargement and fat infiltration of those organs of rabbit in group C were reduced to minimum as compared with the control group, and the findings were also confirmed histologically. The lipid content in liver and some correlated data are shown in Table 3. It is evident that changes induced by cholesterol feeding were minimized in group C in every respect.

Table II

| Group | A: Cholesterol-fed control | | | | | | B: CT 0.2% | | | | | | C: CT 0.5% | | | | | |
|---|---|---|---|---|---|---|---|---|---|---|---|---|---|---|---|---|---|---|
| Days after the start of CT supplement | B.W. | Free cholesterol, mg. percent | Total cholesterol, mg. percent | Phospholipid, mg. percent | F/T | C/P | B.W. | Free cholesterol, mg. percent | Total cholesterol, mg. percent | Phospholipid, mg. percent | F/T | C/P | B.W. | Free cholesterol, mg. percent | Total cholesterol, mg. percent | Phospholipid, mg. percent | F/T | C/P |
| −14 | 3.01 | 65 | 105 | 203 | 0.62 | 0.52 | 3.04 | 68 | 110 | 208 | 0.61 | 0.52 | 2.82 | 70 | 115 | 200 | 0.50 | 0.57 |
| 0 | 2.93 | 126 | 329 | | 0.38 | | 3.01 | 123 | 332 | | 0.37 | | 2.82 | 127 | 352 | | 0.36 | |
| 28 | 3.06 | 206 | 459 | | 0.45 | | 3.16 | 127 | 277 | | 0.46 | | 2.91 | 72 | 135 | | 0.53 | |
| 56 | 3.08 | 346 | 612 | | 0.57 | | 3.19 | 184 | 348 | | 0.48 | | 2.94 | 82 | 105 | | 0.78 | |
| 74 | 3.00 | 373 | 626 | 483 | 0.60 | 1.30 | 3.21 | 192 | 343 | 319 | 0.56 | 1.08 | 2.92 | 69 | 87 | 188 | 0.79 | 0.46 |

The abbreviation "B.W." occurring in Tables I and IV means "body weight." Abbreviations "F," "T," "C" and "P" occurring in Tables I, III, IV and VI mean respective quantities by weight of "free cholesterol," "total cholesterol," "cholesterol" and "phospholipid," and "T" equal "C."

Table III

| Group | A | B | C |
|---|---|---|---|
| Content in wet liver: | | | |
| Total fat (percent) | 9.1 | 7.3 | 3.6 |
| Total cholesterol:C (percent) | 2.56 | 2.10 | 0.43 |
| Free C/Total C | 0.36 | 0.36 | 0.56 |
| Phospholipid:P (percent) | 1.76 | 1.86 | 1.72 |
| C/P | 1.46 | 1.13 | 0.25 |

In view of the above findings obtained together with the histological findings, CT-DF is effective as CT and has less toxicity which is shown also in experiment 1.

Mode of action of CT and its derivatives on the experimental atherosclerosis of rabbits is not exactly clarified yet, but some suggestions will be given by a tracer experiment in rat. But it is stressed from above-mentioned results that the action of these drugs are superior to those of known drugs such as unsaturated fatty acid, β-sitosterol, ascorbic acid, nicotinic acid and several agents which act as inhibitors of cholesterol synthesis.

Table IV

| Group | A: Cholesterol control | | | | | | B: CT-DF 0.1% | | | | | |
|---|---|---|---|---|---|---|---|---|---|---|---|---|
| Days | B.W. | Free cholesterol, mg. percent | Total cholesterol, mg. percent | Phospholipid, mg. percent | F/T | C/P | B.W. | Free cholesterol, mg. percent | Total cholesterol, mg. percent | Phospholipid, mg. percent | F/T | C/P |
| 0 | 2.53 | 65 | 87 | 203 | 0.75 | 0.43 | 2.53 | 60 | 72 | 201 | 0.83 | 0.36 |
| 7 | 2.71 | 53 | 69 | 195 | 0.77 | 0.35 | 2.66 | 49 | 69 | 179 | 0.71 | 0.39 |
| 14 | 2.69 | 93 | 160 | 245 | 0.58 | 0.65 | 2.69 | 77 | 152 | 235 | 0.51 | 0.65 |
| 21 | 2.74 | 118 | 251 | 315 | 0.47 | 0.80 | 2.72 | 90 | 186 | 272 | 0.48 | 0.68 |
| 35 | 2.87 | 213 | 425 | 339 | 0.50 | 1.25 | 2.83 | 137 | 375 | 325 | 0.37 | 1.15 |
| 56 | 2.98 | 192 | 579 | 373 | 0.33 | 1.55 | 2.82 | 197 | 574 | 371 | 0.34 | 1.55 |
| 77 | 2.96 | 414 | 745 | 430 | 0.56 | 1.73 | 2.79 | 407 | 633 | 415 | 0.61 | 1.52 |
| 91 | 3.14 | 415 | 750 | 461 | 0.55 | 1.63 | 2.96 | 199 | 668 | 417 | 0.30 | 1.60 |

| Group | A: Cholesterol control | | | | | | B: CT-DF 0.1% | | | | | |
|---|---|---|---|---|---|---|---|---|---|---|---|---|
| Days | B.W. | Free cholesterol, mg. percent | Total cholesterol, mg. percent | Phospholipid, mg. percent | F/T | C/P | B.W. | Free cholesterol, mg. percent | Total cholesterol, mg. percent | Phospholipid, mg. percent | F/T | C/P |
| 0 | 2.51 | 65 | 81 | 198 | 0.80 | 0.41 | 2.47 | 67 | 88 | 191 | 0.76 | 0.46 |
| 7 | 2.62 | 55 | 67 | 182 | 0.82 | 0.37 | 2.47 | 53 | 69 | 214 | 0.77 | 0.32 |
| 14 | 2.65 | 62 | 111 | 216 | 0.56 | 0.51 | 2.53 | 53 | 77 | 173 | 0.69 | 0.45 |
| 21 | 2.72 | 75 | 118 | 254 | 0.64 | 0.46 | 2.57 | 60 | 75 | 217 | 0.80 | 0.35 |
| 35 | 2.87 | 99 | 171 | 267 | 0.58 | 0.64 | 2.66 | 60 | 86 | 193 | 0.70 | 0.45 |
| 56 | 2.90 | 131 | 321 | 327 | 0.41 | 0.98 | 2.76 | 63 | 96 | 206 | 0.66 | 0.47 |
| 77 | 3.26 | 208 | 309 | 299 | 0.67 | 1.03 | 2.91 | 67 | 88 | 200 | 0.76 | 0.44 |
| 91 | 3.05 | 148 | 311 | 337 | 0.48 | 0.92 | 2.89 | 49 | 86 | 199 | 0.57 | 0.43 |

EXPERIMENT 2

The preventive effect of CT-DF on the dietary atherosclerosis of cholesterol fed rabbits.

The design of this experiment is essentially the same as the Experiment 1 except the following factors.

(i) Each group consisted of 8 rabbits
(ii) CT-DF was given for 7 days before the beginning of cholesterol feeding except group A
(iii) Groups A, B, C and D represent cholesterol diet control, supplemented groups of 0.1, 0.2 and 0.5% CT-DF respectively.

Figure 2:
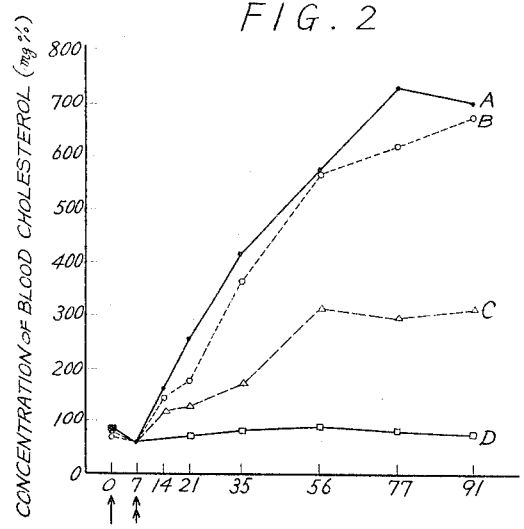

Rabbits of each group grew normally. Shifts of cholesterol and other lipid content in the blood are shown in Table IV and FIGURE 2.

Although beneficial effect was not shown in group B (0.1% of CT-DF), remarkable improvements were noted in group C and D corresponding to the dosage of CT-DF. Supplement of 0.5% CT-DF depressed completely the dietary hypercholesterolemia. Ninety-one days after start of CT-DF feeding (eighty-seven days after cholesterol feeding) rabbits were sacrificed and examined. Degrees of atheroma and lipid content in liver are shown in Tables V and VI.

Table V

| Group (8 rabbits) | A | B | C | D |
|---|---|---|---|---|
| Degree of atheroma of each rabbit in aorta. | 4,4,4,4 4,4,3,0 | 4,4,4,4 4,4,2,0 | 4,3,3,2 2,2,1,0 | 1,0,0,0 0,0,0,0 |
| Average | 3.4 | 3.3 | 2.1 | 0.1 |

Table VI

| Group | A | B | C | D |
|---|---|---|---|---|
| Content in wet liver: | | | | |
| Total fat (percent) | 7.6 | 7.1 | 5.8 | 3.5 |
| Total cholesterol (percent) | 2.7 | 2.5 | 1.6 | 0.3 |
| Free cholesterol (percent) | 0.9 | 0.8 | 0.6 | 0.2 |
| Phospholipid (percent) | 2.1 | 2.0 | 2.1 | 1.9 |
| F/T | 0.33 | 0.32 | 0.38 | 0.67 |
| C/P | 1.25 | 1.25 | 0.76 | 0.16 |

EXPERIMENT 3

The effects of CT and CT-derivatives on the lipemia produced by oral oil administration in rats.

Figure 3:
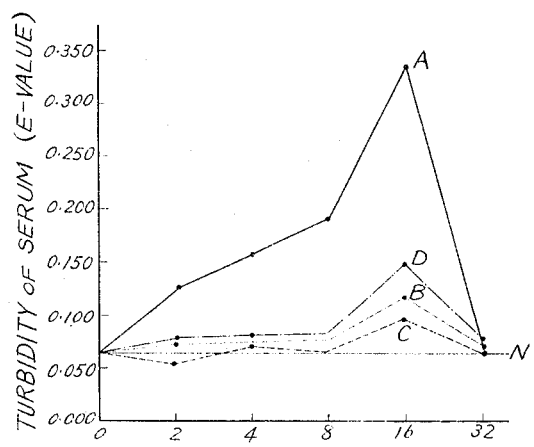

Adult rats weighing 200±20 g. were given 6 ml. of cottonseed oil per rate by a gastric tube, and then they were sacrificed by decapitation at the time as indicated in FIGURE 3 and Table VII in order to estimate the shifts of serum turbidity up to 32 hours after oil administration. Serum was diluted 5 times with water and the turbidity was estimated by optical density at 660 mµ using Coleman spectrophotometer.

The lipemia-clearing effect of drugs were evaluated by the difference of serum optical density between the drug-treated and control groups. Respective doses of 100 mg. expressed as equimolar dose of CT per kilogram (kg.) of body weight of CT, sodium CT-3-hemisuccinate and CT-DF were injected intraperitoneally at the same time of the oil administration.

In FIGURE 3, the curves A, B, C and D represent the shifts in turbidity of control group to which was given saline instead of drug suspension, and CT, sodium CT-3-hemisuccinate and CT-DF treated group respectively. Horizontal N line shows the physiological value of rat serum turbidity without oil treatment. All the drugs tested show the marked inhibitory action on the alimentary lipemia. And there is no significant difference in grades of action among these drugs. Above action seems apparently to be heparin-like but it was demonstrated that the mode of action is quite different from that of heparin by other experiments.

Figure 4:
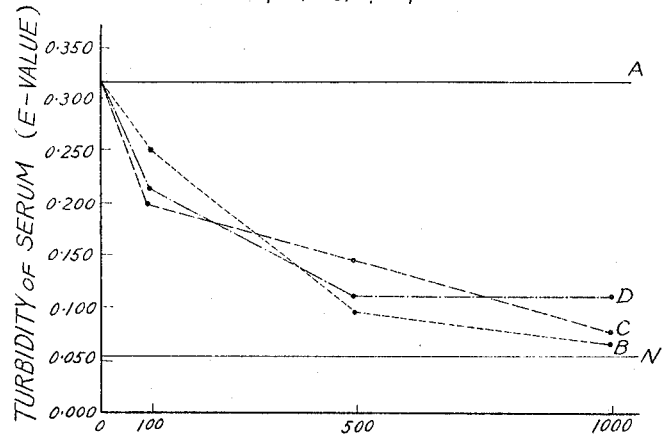

Further Table VIII and FIGURE 4 show the dose-responses of inhibitory action of drugs on the lipemia developing at the 18 hours after oil administration. In this experiment drugs were given orally simultaneously with oil. In FIGURE 4, horizontal A and N line show the level of turbidity of oil treated control (at the 18 hours) and normal rats respectively. All of the drugs tested exhibited a good dose response; 100 mg./kg. showed to be minimum effective dose and the more of dosage was given the more effective action was noted.

Table VII

| Time after oil administration hrs. | A: oil-treated control | B: CT | C: CT-3-hemisuccinate | D: CT-DF |
|---|---|---|---|---|
| | Serum turbidity (E value) =λ660 mµ | | | |
| 2 | 0.122 | 0.071 | 0.056 | 0.078 |
| 4 | 0.157 | | 0.068 | 0.081 |
| 8 | 0.189 | 0.075 | 0.067 | 0.083 |
| 16 | 0.331 | 0.118 | 0.097 | 0.145 |
| 32 | 0.066 | 0.068 | 0.064 | 0.080 |
| N: physiological value | 0.063 | | | |

Table VIII

| | Serum turbidity (E value) λ=660 mµ | | |
|---|---|---|---|
| | 100 mg./kg. | 500 mg./kg. | 1000 mg./kg. |
| A: Oil treated control | | 0.316 | |
| B: CT | 0.251 | 0.096 | 0.069 |
| C: Sodium-CT-3-hemisuccinate | 0.199 | 0.144 | 0.079 |
| D: CT-DF | 0.215 | 0.111 | 0.110 |
| N: Physiological value | | 0.055 | |

EXPERIMENT 4

The effect of CT and its derivatives on the hypercholesterolemia and the liver lipid accumulation in cholesterol fed rats. The prophylactic effect of CT and sodium CT-3-hemisuccinate on the hypercholesterolemia and the liver lipid accumulation in the weaning rats fed the synthetic diet * supplemented with 1% cholesterol and 0.2% of sodium cholate.

Drugs were admixed to the basal diet at rate of 0.1, 0.25 and 0.5% respectively. In all cases examined, drugs did not affect significantly the hypercholesterolemia and liver phospholipid content, but apparently depressed the levels of liver total fat and cholesterol. Results were shown in Table IX.

Table IX

| Group | Dose, percent in diet | Liver fat, percent in wet weight | Liver cholesterol in wet weight | Liver phospholipid in wet weight |
|---|---|---|---|---|
| CT | 0.5 | 6.34 | 1,585 | 1,830 |
| | 0.25 | 9.05 | 3,025 | 1,485 |
| | 0.1 | 10.07 | 3,395 | 1,400 |
| Sodium CT-3-hemisuccinate | 0.5 | 7.14 | 2,410 | 1,495 |
| | 0.25 | 9.26 | 3,680 | 1,310 |
| | 0.1 | 10.90 | 4,455 | 1,320 |
| Cholesterol fed control | | 12.33 | 4,375 | 1,460 |
| Normal rat | | 2.87 | 295 | 1,750 |

EXPERIMENT 5

Antihypercholesterolemic effect of CT-DF on the cholesterol fed chicklings. Two weeks old female chicklings were distributed into 3 groups A, B and C, each consisting of 15 in number.

Group A was fed commercial diet (CD)
Group B: fed CD plus 1% of cholesterol
Group C: fed CD plus 1% of cholesterol plus 1% of CT-DF.

After 2 weeks, the levels of lipid in serum were determined and shown in Table X together with the gains of body weight.

Table X

| Group | Cholesterol (mg. percent) | Phospholipid (mg. percent) | C/P | Gains of body weight (g.) |
|---|---|---|---|---|
| A: normal control | 154±14.7 | 246±20.7 | 0.63 | 213 |
| B: cholesterol control | 404±74.8 | 183±24.5 | 2.19 | 220 |
| C: cholesterol+CT-DF | 187±20.0 | 161±17.1 | 1.27 | 205 |

CT-DF showed apparent anti-hypercholesterolemic effect accompanying moderate C/P rate without growth inhibition of chickling.

EXPERIMENT 6

Effect of repeated CT oral dosage on fecal excretion of cholesterol-4$C^{14}$ injected intravenously in rats. Twelve male rats were fed sterol-feed synthetic diet; six of them were kept as control and the other six were given 25 mg. of CT per rat daily by a gastric tube for 18 days. At the 13th day of CT administration, 2.66 µc. of cholesterol-4$C^{14}$ per rat was injected intravenously to the rats of both groups, and feces were collected daily for 5 days.

The feces collected at the 2nd and 3rd day were analyzed to find differences of fecal constituents between two groups. Results are shown in Table XI.

The total $C^{14}$ activity excreted in feces of the CT group was 52% higher than that of the control group. The $C^{14}$ activity and the nonactive material of the fecal ---
* Synthetic diet: Casein 15%, hydrogenated coconut oil 10%, glucose, salt and vitamin-supplement up to 98.8%.

cholesterol fraction in the CT group were approximately three times and 30% higher than those of the control

*Table XI*

|  | Control group | CT group |
|---|---|---|
| Feces: |  |  |
| Dry weight (g.) | 0.50 | 0.56 |
| Total C activity (c.p.m.) | 104,791 | 158,801 |
| Recovery for injected activity (percent) | 5.91 | 8.96 |

|  |  | Percent to total excretion |  | Percent to total excretion |
|---|---|---|---|---|
| Fractions of Feces: |  |  |  |  |
| I. Cholesterol fraction $C^{14}$ activity (c.p.m.) | 30,335 | 30.8 | 95,391 | 61.6 |
| Nonactive material (mg.) | 5.36 |  | 6.89 |  |
| II. Bile acids fraction $C^{14}$ activity (c.p.m.) | 50,058 | 51.3 | 39,232 | 25.2 |
| Nonactive material (mg.) | 5.01 |  | 9.62 |  |
| III. The other fractions $C^{14}$ activity (c.p.m.) | 17,441 | 10.7 | 20,595 | 13.2 |
| Ratio: |  |  |  |  |
| Fraction I ($C^{14}$)/Fraction II ($C^{14}$) |  | 0.61 |  | 2.43 | group respectively. In contrast to these results, the $C^{14}$ activity of the fecal bile acids fraction in the CT group was approximately 80% of the control group, while the nonactive substance of this fraction in the CT group was twice of that in the control group. But the apparent increase of nonactive bile acids fraction in CT group might possibly include the excreted bile acids deriving from CT.

It is interesting to note that the excretion pattern of labeled cholesterol or the ratio of cholesterol to bile acids in feces was inverted in both groups, and that the CT-feeding increased not only the excretion of labeled cholesterol injected but also the excretion of non-labeled cholesterol which was 30% higher than that of control group. These results suggest a mode of CT-action, namely CT accelerates profoundly the excretion of neutral sterol in feces.

EXPERIMENT 7

Inhibitory effect of CT on the cortisone enhancement of Staphylococcus infection in mice. Twenty mice are divided into four groups A, B, C and D.

Group A—non drug group—was infected intravenously with 0.2 ml. of 10 fold dilution of bouillon culture of *Staphylococcus aureus* (Heatley) which was cultured for 18 hours.

Group B—cortisone control—was given subcutaneously 1 mg./mouse of cortisone acetate simultaneously with straphylococcus infection.

Group C—CT treated group—from 3 days before infection through up to 4 days after, 0.4 mg./mouse/day of CT was injected subcutaneously for 8 days.

Group D—cortisone and CT treated group—was the combination of treatments in B and C groups.

Mortality and rate of occurrence of renal abscess during 14 days after infection are shown in Table XII.

*Table XII*

|  | Mortality, percent |  |  |  |  |  | Cases with renal abscess |
|---|---|---|---|---|---|---|---|
| Days | 2 | 3 | 4 | 5 | 6 | 7 | 14 |  |
| Group: |  |  |  |  |  |  |  |  |
| A | 0 | 0 | 0 | 20 | 20 | 20 | 20 | 2/5 |
| B | 40 | 60 | 60 | 80 | 80 | 100 | 100 | 5/5 |
| C | 0 | 0 | 0 | 0 | 0 | 0 | 0 | 3/5 |
| D | 0 | 0 | 0 | 0 | 0 | 0 | 0 | 2/5 |

It will clearly be noted that CT counteracts the enhancing effect of cortisone acetate on the straphylococcus infection in mice.

EXPERIMENT 8

The effects of CT and CT-DF on the infection with *Streptococcus haemolyticus* in mice.

Group A (10 mice)—non drug control—mice were infected by subcutaneous injection with 0.5 ml. of 1000 fold dilution of bouillon culture of Streptococcus E-14.

Group B—CT treated group—mice received subcutaneous injection of 1 mg./mouse of CT 3 days before infection, and after infection, they were fed diet supplemented with 0.1% of CT-DF. Mortality during 7 days after infection is shown in Table XIII.

*Table XIII*

|  | Mortality, percent |  |  |  |  |  |  |
|---|---|---|---|---|---|---|---|
| Days | 1 | 2 | 3 | 4 | 5 | 6 | 7 |
| Group: |  |  |  |  |  |  |  |
| A | 30 | 80 | 80 | 90 | 90 | 90 | 90 |
| B | 10 | 40 | 40 | 50 | 50 | 50 | 50 |

The results indicate that CT and CT-DF increase native resistance to streptococcus infection in mice.

EXPERIMENT 9

The effect of CT on the infection of *K. pneumoniae* in mice.

Group A (10 mice)—non drug control—mice were infected by intravenous injection with 0.25 ml. of 100 fold dilution of bouillon culture of *K. pneumoniae* which was cultured for 18 hours.

Group B—CT treated group—1 mg./mouse of CT was injected 6 days before infection.

Mortality during 7 days after infection is shown in Table XIV.

*Table XIV*

|  | Mortality, percent |  |  |  |  |  |  |
|---|---|---|---|---|---|---|---|
| Days | 1 | 2 | 3 | 4 | 5 | 6 | 7 |
| Group: |  |  |  |  |  |  |  |
| A | 0 | 10 | 70 | 90 | 100 | 100 | 100 |
| B | 0 | 10 | 20 | 30 | 40 | 40 | 60 |

EXPERIMENT 10

The effect of CT-DF, isoniazid (hereinafter referred to INH) and their combination on the tuberculous infection in mice.

Experimental design is a follows:

Group A (10 mice)—non drug control—was infected by i.v. injection with appropriate doses of *M. tuberculosis* H37Rv.

Group B—INH treated group—was fed the diet containing 0.001% of INH.

Group C—CT-DF treated group—was fed the diet supplemented with 0.1% of CT-DF.

Group D—Combination of CT-DF and INH group—was fed the diet supplemented with 0.1% of CT-DF and 0.001% of INH.

Survival time (ST 50) was calculated from the mortality curve of mice and shown in Table XV, but because the mortality was so small that it was not possible to estimate the ST 50 in group D, the data of death of each mouse were presented.

*Table XV*

| Group | A | B | C |
|---|---|---|---|
| ST 50 (days) | 16.9 | 19.8 | 17.4 |

D: 15, 21, 22, 23, 38, 42, >49, >49, >49, >49 days.

The results indicate that CT-DF enhances the therapeutic effect of INH by increasing the native resistance of mice to tuberculous infections.

EXPERIMENT 11

Toxicity test:

(1) Acute toxicity was observed as $LD_{50}$ of mice and shown in Table XVI.

*Table XVI*

| Samples [1] | IV. (mg./kg.) | Oral (mg./kg.)[2] |
|---|---|---|
| CT | 270 | >5,000 |
| Sodium CT-3-hemisuccinate | 158 | >5,000 |
| CT-DF | 3,400 | >5,000 |

[1] Suspension of drugs is used.
[2] There is no death at a dose of 5,000 mg./kg.

(2) Subacute toxicity.

Groups of twenty male rats weighing 95±5 g. were fed the diet supplemented with 0.1, 0.25 and 0.5% of CT (Group A) sodium CT-3-hemisuccinate (B) and 0.25% of CT-DF (C) respectively. Gain of body weight, intake of food and food efficiency during 4 weeks are shown in Table XVII.

*Table XVII*

| Samples | Supplement (percent) | Gain of body weight (g.) | Food intake (g.) | Food efficiency (percent) |
|---|---|---|---|---|
| A | 0.1 | 111.2 | 497.5 | 22.35 |
|   | 0.25 | 59.2 | 368.0 | 16.09 |
|   | 0.5 | 1.5 | 227.8 | 0.66 |
| B | [1] 0.1 | 120.5 | 501.7 | 24.02 |
|   | [1] 0.25 | 73.9 | 396.7 | 18.64 |
|   | [1] 0.5 | 17.9 | 263.8 | 6.79 |
| C | [1] 0.25 | 127.0 | 526.8 | 24.11 |
| Control |  | 128.1 | 526.0 | 24.35 |

[1] Figures are expressed as equimolar to CT.

In another experiment, it was demonstrated that the growth inhibitory effect of CT (0.3% in diet) in mice was reversed by adding the same concentration of cholesterol in the diet. In this connection it is interesting to note that no toxic effects were noted in rabbits in Experiment 1.

(3) Chromic toxicity tested in dogs and monkeys.

Daily oral dosage of 50 mg./kg./day of CT for a year in dogs and monkeys did not cause any toxic symptoms. Increase in body weight, blood picture, liver function test (B.S.P.), appetite and general behaviors remained normal.

After 13.5 months, a monkey was sacrificed and anatomical and histological examination revealed no abnormal finding. Body weight and blood picture of this monkey are shown in Table XVIII.

Also daily dosage of 100 mg./kg. of CT-DF in 3 monkeys has been continued over 3 months and there has not so far been found any toxic signs.

EXPERIMENT 12

Effect of CT-DF on the human serum cholesterol levels. Nine volunteers of healthy male colleagues (adults) were given CT-DF for seven days as follows: 0.5 g./day for the first 2 days, divided twice or three times a day just after meal, followed by the doses of 1.0 g./day for 2 days and the dosages were increased to 2.0 g./day for 3 days.

*Table XVIII*

| Period (month) | Body weight (kg.) | Red cells | White cells | Haemoglobin (g./dl.) | Haematocrit (percent) | Differential count (percent) | | | | | Cholesterol in blood (mg. percent) |
|---|---|---|---|---|---|---|---|---|---|---|---|
| | | | | | | Neut. | Lym. | Mono. | Eos. | Bas. | |
| 0 | 4.5 | 560 | 16,470 | 13.4 | 41.0 | 26.0 | 67.5 | 5.5 | 0 | 1.0 | 149 |
| 1 | 4.45 | 570 | 13,730 | 14.2 | 44.9 | 39.0 | 57.0 | 4.0 | 0 | 0 | 162 |
| 2 | 4.55 | 550 | 10,530 | 13.0 | 43.3 | 24.0 | 72.5 | 3.0 | 0 | 0.5 | 168 |
| 3 | 5.0 | 450 | 28,500 | 11.0 | 38.0 | 8.0 | 91.5 | 0.5 | 0 | 0 | 146 |
| 5 | 5.9 | 430 | 11,620 | 13.0 | 39.0 | 24.0 | 73.0 | 2.5 | 0 | 0.5 |  |
| 6 | 6.1 | 580 | 8,110 | 14.0 | 45.0 | 21.5 | 78.0 | 0.5 | 0 | 0 | 154 |
| 8 | 6.7 | 590 | 12,640 | 14.5 | 45.0 | 34.0 | 62.0 | 2.5 | 1.0 | 0.5 |  |
| 10 | 6.4 | 680 | 11,060 | 17.5 | 54.0 | 25.0 | 67.0 | 7.5 | 0.5 | 0 |  |
| 12 | 6.5 | 571 | 10,870 | 15.3 | 48.0 | 28.5 | 68.5 | 2.5 | 0.5 | 0 | 155 |
| 13.5 | 6.5 | 530 | 12,510 | 15.0 | 46.0 | 30.5 | 65.0 | 4.0 | 0.5 | 0 | 138 |

None of the volunteers complained any side effects, and the cholesterol levels before and after the administration of CT-DF are shown in the following Table XIX.

*Table XIX*

| Name | Age | Total cholesterol values in plasma (mg. percent) | |
|---|---|---|---|
| | | Before treatment | After treatment |
| J.M. | 39 | 159 | 181 |
| J.W. | 47 | 236 | 259 |
| K.T. | 53 | 241 | 255 |
| M.M. | 36 | 203 | 189 |
| K.K. | 45 | 203 | 189 |
| S.O. | 47 | 212 | 208 |
| F.S. | 36 | 252 | 189 |
| E.O. | 44 | 240 | 218 |
| Average |  | 218 | 211 |

As shown in the table it should be noted that the drug does not affect significantly the human cholesterol levels of the normal healthy male adults in this short-term dosage.

Three colleague-volunteers who are slightly hypertensive are given 1.8 g./day of CT-DF for 6 months under the care of a physician. All of them complained no hazards during the administration except one who felt a slight gastric distress but physician's opinion suggests that the said volunteer complained of some gastric distress even before the treatment. The remaining two improved various hypertonic subjective complaints and were eager to continue to take the drug.

The blood cholesterol levels before and after the treatment are shown in the following Table XX.

It is noteworthy to see in the case of M.A., a remarkable hypocholesterolemic action of CT-DF was observed and it should also be recognized that the value did not come down below the normal levels. The similar tendency was also observed in the other two (J.W. and S.K.).

Table XX

| Name | Age | Total cholesterol values in serum (mg. percent) | | | | | |
|------|-----|--------|--------|--------|--------|---------|---------|
|      |     | Before | 20 day | 46 day | 90 day | 151 day | 184 day |
| M.A. | 53  | 303±15 | 217    | 232    | 220    | 209     | 212     |
| J.W. | 47  | 259±0  | 209    | 239    | 209    | 221     | 225     |
| S.K. | 52  | 267±10 | 186    |        |        |         |         |

CLINICAL RESULTS

*Case 1.*—An 82 year old male, retired scientific officer. (Dr. R. T.) 61 kg.

Since 1956, the patient began to complain of a pain on his left leg after a long walk and recently, his pain appeared after only 300-meter-walking, and continued about five minutes thereafter (rest pain). He complained of feeling coldness on his left leg at night. Physical examination revealed no abnormalities including skin color and trophic conditions. Blood pressure: 160/82. Patellar reflex normal. Art dorsalis pedis palpable. Trace protein but no blood element in urine. No habit of smoking. Serum cholesterol: 295 mg. percent.

Diagnosis: Claudicatio intermittans.

Since Feb. 2, 1961, two tablets (0.4 gr.) of CT-DF were given 3 times per day after meal for 2 months and 10 tablets per day (2.0 g.) thereafter. After about one month from the first administration, improvement in his pain was noted and he became able to walk without pain about 450 meters. Now he can walk without complaint over 600 meters on November 6, 1961 and his "rest-pain" disappeared very rapidly. The rather dramatic improvement in the symptom of intermittent claudication can apparently be considered as an effect of the drug.

During 9 months-long administration no sign of side effects has been found by continuous careful clinical observations.

*Case 2.*—A 64 year old male, 70 kg. (H. T.), an executive director of a company.

Since several years, the patient felt pain on both legs after a long walk. Recently he became obese and complained more trouble. The walking distance was only 200 to 500 meters. And he complained of "rest pain" but time required to recover was variable. Paresthesia and cold feeling on his legs. Neither changes in skin color nor trophic conditions of his legs. Blood pressure: 160/90. Wasserman reaction: negative. Heavy smoker.

Diagnosis: Claudicatio intermittans.

Three CT-DF tablets were given three times a day after meal (1.8 g./day). After three months of the medication placebo was substituted for one month, and thereafter the doses of 1.8 g. per day of CT-DF was maintained. After about two weeks since the first administration of the drug, the patient recognized alleviation of pain, and he could walk about 1,000 meters without pain, but his complaint recurred distinctly when the drug was switched to the placebo. As soon as the second CT-DF treatment started after the placebo, the patient showed remarkable improvement again. The patient is still administered with the 1.8 g. per day dose of CT-DF for about six months without any side effects.

*Case 3.*—A 45 year old male, 75 kg. (K. B.) Taxi-driver.

Since about one year, the patient felt pain on both legs after 1,000 to 1,500 meters walking. No skin abnormality. Blood pressure: 156/88. Patellar reflex normal. Moderate smoker.

Diagnosis: Claudicatio intermittans.

Three tablets of CT-DF were given three times per day after meal (1.8 g./day). After two weeks, conditions improved considerably and walking distance increased to 2,000–3,000 meters. This dosage is being continued favorably for six months without any side effects.

Having thus disclosed the invention, what is claimed is:

1. A method of controlling atherosclerosis in a patient subject to high blood cholesterol level which consists in administering to the patient an effective amount of a member selected from the group consisting of cholestane-3,5,6-triol, cholestane-3,5,6-triol 3,6-diformate, cholestane-3,5,6-triol 3-hemisuccinate and alkaline salts thereof.

2. The method according to claim 1, wherein the compound is cholestane-3$\beta$,5$\alpha$,6$\beta$-triol.

3. The method according to claim 1, wherein the compound is cholestane-3$\beta$,5$\alpha$,6$\beta$-triol, 3,6-diformate.

4. The method according to claim 1, wherein the compound is cholestane-3$\beta$,5$\alpha$,6$\beta$-triol 3-hemisuccinate.

5. A method according to claim 3 for the therapy of claudicatio intermittans.

6. A chemotherapeutic composition consisting essentially of, as active ingredients, isonicotinylhydrazine and a member selected from the group consisting of cholestane-3,5,6-triol, cholestane-3,5,6-triol 3,6-diformate, cholestane-3,5,6-triol 3-hemisuccinate and alkaline salts thereof, said ingredients being present in therapeutically significant amounts and in admixture with a pharmaceutically acceptable carrier constituting essentially the remainder of the composition.

7. Cholestane-3$\beta$,5$\alpha$,6$\beta$-triol 3-hemisuccinate.

8. Cholestane-3$\beta$,5$\alpha$,6$\beta$-triol 3-phosphate.

9. Cholestane-3$\beta$,5$\alpha$,6$\beta$-triol 3-sulfate.

References Cited by the Examiner

UNITED STATES PATENTS 2,569,300  9/1951  Fieser et al. _____ 260—397.1
2,871,160  1/1959  Johnson et al. _____ 167—77

OTHER REFERENCES

Applezweig: Steroid Drugs, pp. 222–234, 1962, McGraw-Hill Book Co., N.Y., RM–799–A6.

Fieser et al.: J.A.C.S., 71, pages 3938–41, December 1959.

Fieser et al.: Steroids, pages 189–191 (1959), Reinhold Publishing Co., New York, N.Y.

JULIAN S. LEVITT, *Primary Examiner.*

M. LIEBERMAN, L. GOTTS, *Examiners.*

HENRY FRENCH, LEROY RANDALL,
*Assistant Examiners.*